Sept. 15, 1936.  C. FIELD  2,054,073

HEAT EXCHANGE APPARATUS AND METHOD

Filed May 23, 1930   3 Sheets-Sheet 1

INVENTOR
CROSBY FIELD
BY
Janney, Blair & Curtis
ATTORNEYS

Sept. 15, 1936.  C. FIELD  2,054,073
HEAT EXCHANGE APPARATUS AND METHOD
Filed May 23, 1930   3 Sheets-Sheet 2

CROSBY FIELD
INVENTOR
BY Janney, Blair & Curtis
ATTORNEYS

Sept. 15, 1936.     C. FIELD     2,054,073
HEAT EXCHANGE APPARATUS AND METHOD
Filed May 23, 1930     3 Sheets-Sheet 3
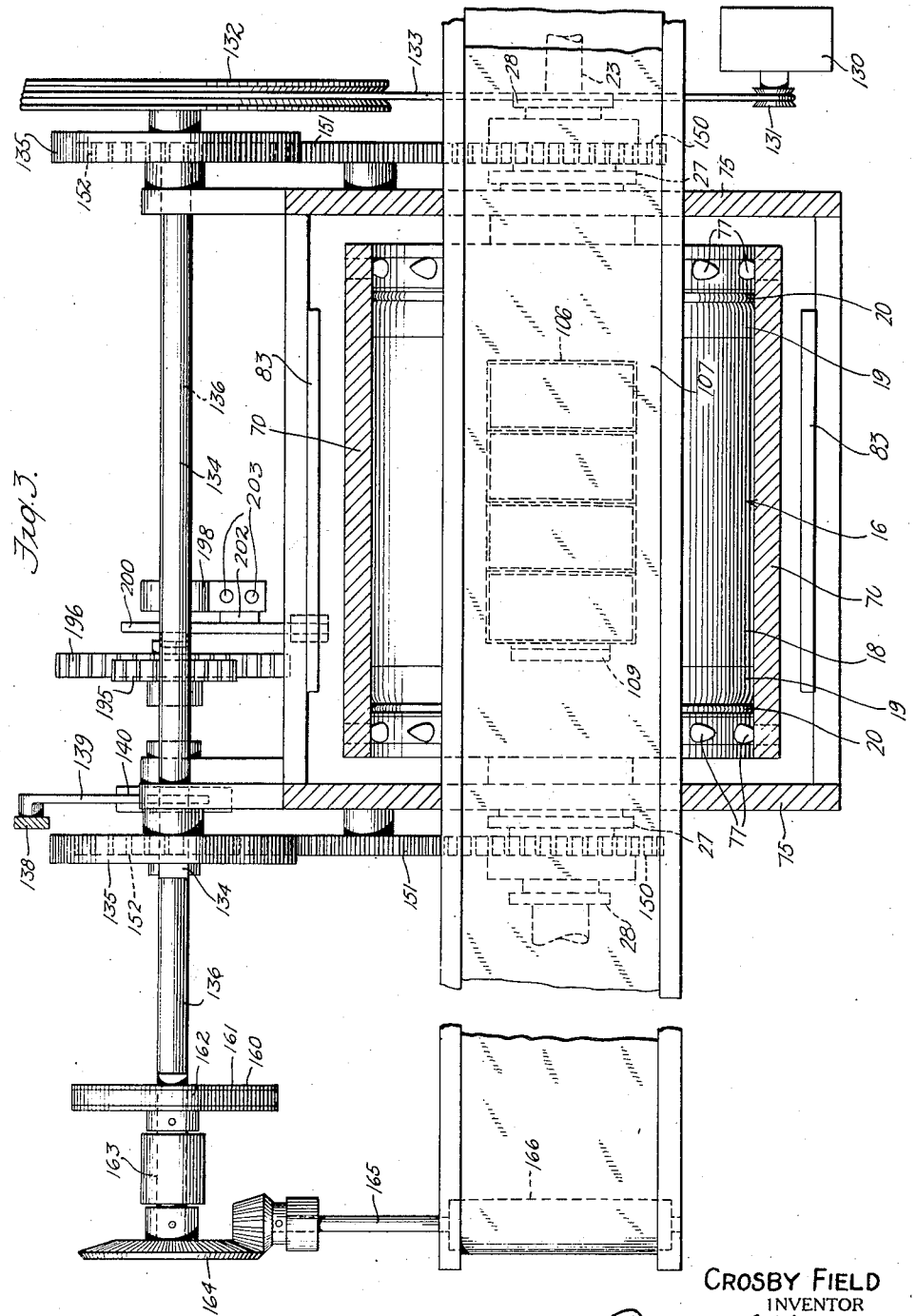
CROSBY FIELD
INVENTOR
BY Janney, Blair & Curtis
ATTORNEYS Patented Sept. 15, 1936

2,054,073

UNITED STATES PATENT OFFICE 2,054,073

HEAT EXCHANGE APPARATUS AND METHOD

Crosby Field, Brooklyn, N. Y., assignor, by mesne assignments, to Flakice Corporation, Wilmington, Del., a corporation of Delaware Application May 23, 1930, Serial No. 454,852

69 Claims. (Cl. 62—105)

This invention relates to the art of heat exchange and apparatus for use in connection therewith.

The particular illustrative application of the invention hereinafter described is especially concerned with the manufacture of ice in the form of small blocks or cakes such as cubes and is designed to enable these to be rapidly and economically produced in large volume. Furthermore, the apparatus is contrived to be simple and durable in construction, efficient and automatic in action and capable of withstanding the exacting conditions of commercial use.

These and other objects, general and particular, may best be appreciated by reference to the accompanying drawings, wherein Fig. 1 is a vertical sectional view substantially on the line 1—1 of Fig. 2, portions of the operating mechanism being illustrated diagrammatically;

Fig. 3 is a horizontal sectional view substantially on the line 3—3 of Fig. 2.

The apparatus in the form shown comprises in general a deformable cylinder revolubly mounted within a tank containing water or other liquid to be solidified, the cylinder being partially immersed in such liquid. About this cylinder is wrapped a heavy flexible apron of rubber or other suitable material having perforations or openings extending therethrough in a portion thereof so that this portion resembles a grill. When this portion of the apron is in contact with the periphery of the cylinder, these openings form with the cylinder wall a series of pockets on such periphery into which the liquid flows and within which it is solidified by heat exchange through the cylinder wall. A lining of rubber or other suitable material may be placed on the inner periphery of this cylinder and this lining provided with openings to match on the inside of the cylinder the grill pattern of the apron on the outside thereof. The ice formed in the pockets is detached from the cylinder wall by deformation of such wall and then carried by the apron to suitable discharge mechanism by which it is removed from the pockets therein. Thus, this belt, or apron, serves as an intermediate medium positioned between a freezing surface and liquid supply, and about which the liquid solidifies so that, when the belt is removed from the freezing surface, it carries the solidified liquid therewith.

The tank

Figure 1:
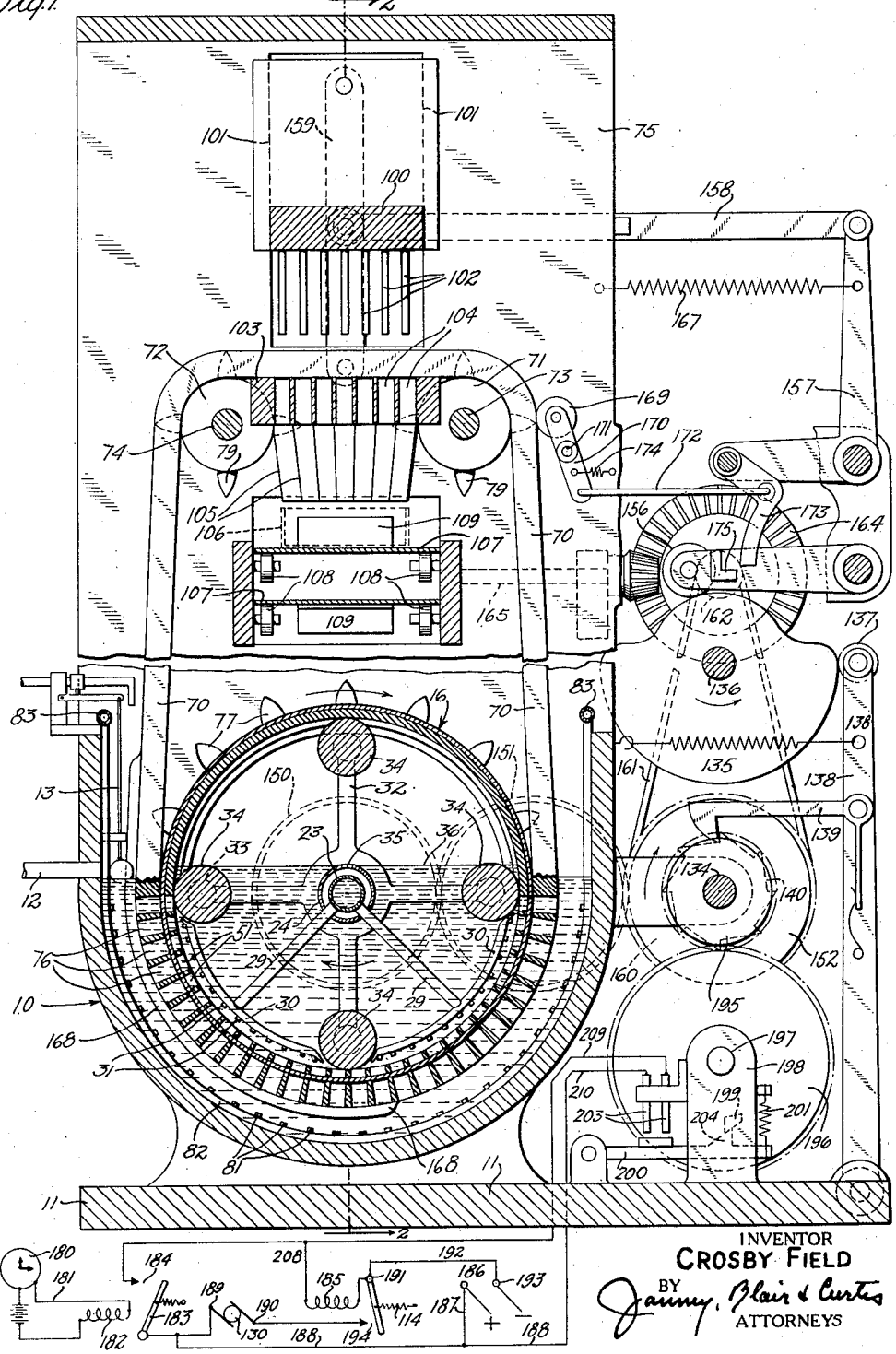
Figure 2:
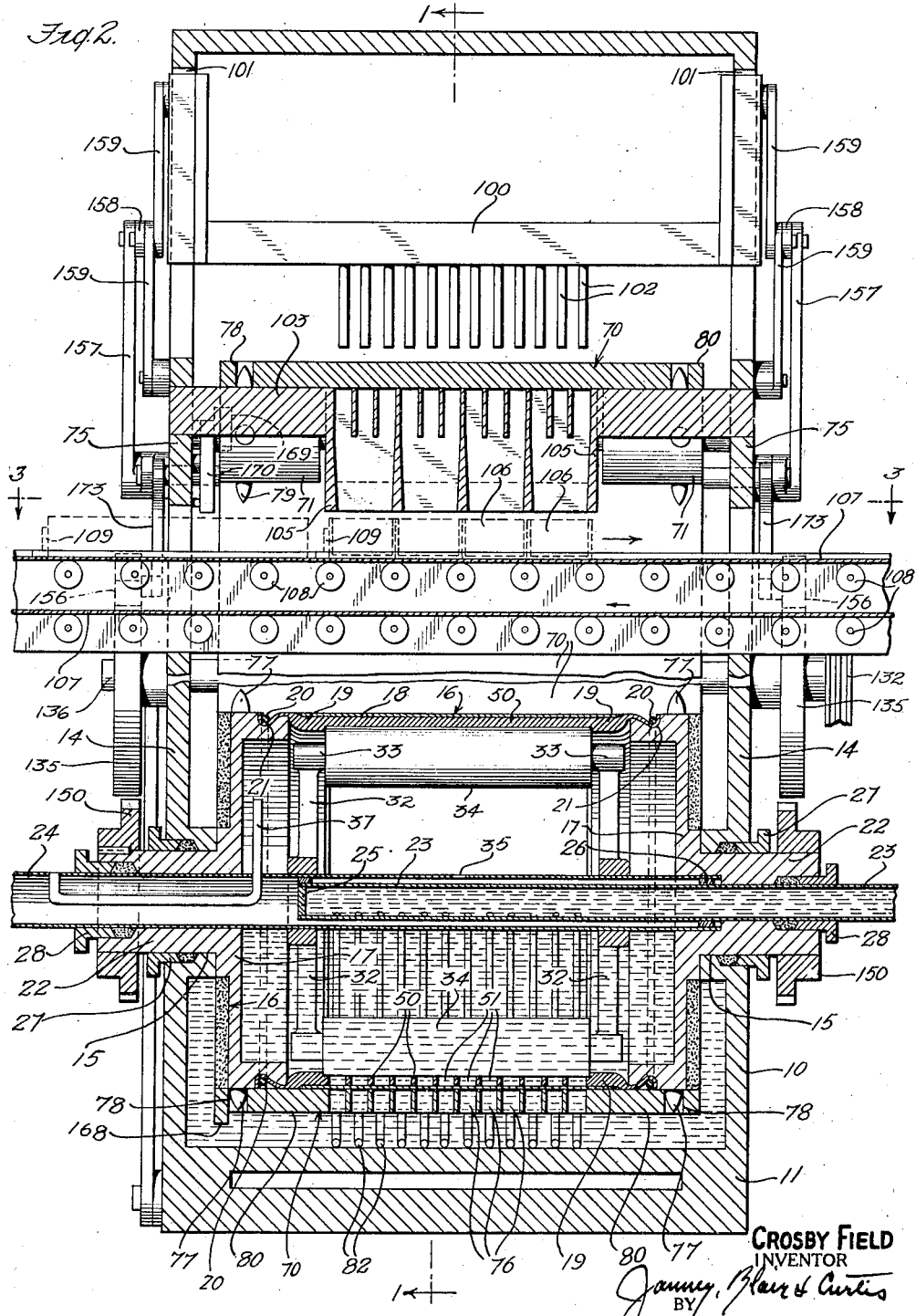
Fig. 2 is a vertical sectional view on the line 2—2 of Fig. 1.

Referring to the lower portion of Figs. 1 and 2, there is shown a tank 10 which is provided with a suitable base 11. This tank is open at the top and the walls thereof preferably insulated to prevent the conduction of heat therethrough. Water enters the tank through a supply pipe as 12 (Fig. 1) and is maintained at a constant level by any suitable means such as the float valve 13. In the end walls 14 (Fig. 2) of this tank are provided bearings as 15 within which the cylinder 16 revolves. These end walls extend upwardly beyond the side walls to form supports for portions of the mechanism.

The cylinder construction

Referring to Fig. 2, the cylinder 16 comprises well insulated end bells 17, a thin flexible cylindrical wall 18 of good heat conductivity interposed therebetween, a flexible lining 50 preferably of rubber or other heat insulating material fitting the inner periphery of the wall 18, and end aprons 19 of rubber or the like forming a flexible connection between the wall 18 and the corresponding end bells. These end aprons 19 extend over the corresponding margins of the bells, and are bound thereto by means of wire loops 20 acting in conjunction with grooves 21 formed in the bells. On each of the bells 17 is formed a hub 22 which fits within a corresponding bearing 15 in the tank 10 and these hubs act to support the cylinder. Through these hubs extend stationary pipes 23 and 24 which are concentric with the cylinder, the pipe 23 being connected to a source of supply of a refrigerating medium and forming the inlet pipe, and the pipe 24 being the discharge pipe for this medium. The pipe 23 is closed at its inner end by a plug or other convenient means as at 25 and the pipe 24 is similarly closed by a ring as 26 fitting between the pipes 23 and 24. There may be provided at each end of the cylinder, stuffing boxes or packing as 27 and 28 to form fluid tight joints between the hubs 22 and the bearings 15 and the pipes 23 and 24.

By referring to Fig. 1 near the bottom of the sheet, it will be seen that within the cylinder 16 there are branch pipes 29 leading radially from the supply pipe 23 and the outer extremities of these pipes are connected to spraying devices 30 each having upon its outer face a plurality of nozzles 31. Reverting to Fig. 2, within the cylinder 16 and substantially opposite the corresponding margins of the cylindrical wall 18 are oppositely disposed spiders 32 fixed on the pipe 24 and having at the outer end of the arms thereof, bearings 33 in which are revolubly mounted rollers

34. These rollers are arranged in pairs with the rollers of each pair diametrically opposite and acting in opposition. The diametrical distance between the lines of contact of the rollers of each pair with the inner periphery of the wall 18 is slightly greater than the normal internal diameter of this wall, so that a deformation of the wall is produced when the cylinder is revolved as the spider and rollers remain stationary, except that the latter rotate about their own axes.

In the top of the pipe 24 within the cylinder 16 is formed an outlet 35 into which the brine or other refrigerating medium empties when the same reaches this level. In Fig. 1 this level is indicated by the broken line 36. Surplus air in the cylinder 16 may pass therefrom through a suitable air vent as 37.

The lining 50 in the cylinder 16 forms a track on which the deforming rolls 34 operate. This lining is provided with a series of perforations or openings 51 extending therethrough so that in the present form the lining as a whole resembles a grill. These openings expose portions of the inner surface of the cylinder and the refrigerating medium is projected on such surface through these openings by the corresponding nozzles 31 which are preferably directly opposite thereto when the cylinder is in freezing position as shown in the drawings.

The apron

A heavy flexible apron 70 of rubber or other suitable material in the form of an endless belt is wrapped about the submerged portion of the cylinder 16 and over idler rolls 71 and 72 revolubly mounted on shafts 73 and 74 supported in suitable bearings (not shown) in the extensions 75 of the end walls 14 of the tank 10. This apron has an open meshed portion extending over at least a portion of its length, say approximately one half the circumference of the cylinder, in the form of a series of perforations or openings 76 extending therethrough and being of substantially the same size and shape as the openings or perforations 51 in the lining 50 and arranged so that these will be in substantial registration when the cylinder 16 and apron are in freezing position as indicated in Fig. 1. These perforations form with the cylindrical wall 18 a series of joined pockets or compartments into which the water in the tank 10 flows when the parts are in this position. The refrigerating medium projected by the nozzles 31 into the perforations 51 in the lining of the cylinder at this time acts through the wall 18 of the cylinder to cause the water within the pockets to be frozen. The portion of the apron above the water level in the position shown is generally not provided with such perforations.

Referring particularly to Fig. 2, it will be seen that there are provided on the periphery of each of the end bells 17 of the cylinder 16, a series of teeth 77 forming in each case a sprocket, and these teeth are adapted to enter corresponding preferably reinforced slots 78 in the marginal portion of the apron so that the apron will be driven by the cylinder when the later is rotated. On the periphery of the idler rolls 72 may be provided similar teeth 79 to enter the slots 78 in the apron. The perforations 76 may be confined to the portion of the apron which is disposed opposite the perforated lining 50, leaving the marginal portions 80 unperforated to form straps connecting the ends of the unperforated section of the apron and taking up the longitudinal strain on the apron. The slots 78 are located in these straps. Opposite each of the pockets 76 in the apron, when the parts are in the position shown, is a nozzle 81 which is adapted to discharge compressed air therein during the freezing process to aid in making the ice clear. These nozzles are formed on a series of pipes 82 (Fig. 2 at the bottom) located in the tank 10 and arranged in parallel with each pipe disposed opposite one circumferential row of pockets. These pipes are connected to a main air supply pipe 83 (Fig. 1) communicating with a source of air under pressure (not shown).

The discharge mechanism

Referring to Figs. 1 and 2 and particularly the upper portion thereof, a platform 100 is vertically slidable in suitable guides 101 in the extensions 75 of the end walls of the tank 10. In the under face of this platform 100 are a plurality of depending fingers 102 which form plungers to eject the ice from the pockets 76 in the apron 70. Directly beneath this platform 100 is located a discharge table 103 supported at its ends on the tank wall extensions 75 and the apron 70 passes over this table. The table is provided with a plurality of slots 104 which may be slightly larger in cross sectional area than the blocks or cubes formed in the pockets 76 of the apron and adapted to substantially register with such pockets when the apron is in any one of its discharge positions. Beneath this table 103 may be provided funnels 105 which conduct the blocks or cubes from slots 104 toward cartons 106 carried by a conveyor 107 extending transversely of the apparatus. These funnels may be slightly inclined inwardly as shown to cause the ice cubes to be assembled more closely as they enter the cartons. The conveyor 107 may be supported by guide rolls 108 or other suitable means, and upon the operating face of this conveyor may be placed pusher blocks 109 (Fig. 2) at suitable intervals to insure proper positioning and advance of the cartons thereon. In the form shown (Fig. 3) enough cartons are placed on the apron at one time to receive a single freezing of cubes.

The operating mechanism

The various parts of the mechanism are operated by a motor as 130 (Fig. 3) or other suitable source of power. A pulley 131 on the main shaft of this motor drives a pulley 132 through the medium of a belt 133 and provides the proper speed reduction. The pulley 132 is secured upon the outer end of a shaft 136 mounted in suitable brackets on the walls of the tank and upon this shaft are fixed duplicate cams 135. One of these cams drives the shaft 134 through the medium of the cam follower 137, rocking lever 138, spring pressed pawl 139 and ratchet 140 fixed on the shaft 134. Gears 150 (Figs. 2 and 3) on the opposite hubs of the revoluble cylinder 16 are driven from the shaft 134 through like trains of gearing consisting of gears 151 and 152, the gears 152 being fixed on the shaft 134. The cams 135 also operate the vertical reciprocating platform 100 through the medium of corresponding cam followers 156 operating bell cranks 157, rods 158 and toggles 159. The conveyor 107 is intermittently driven from the shaft 134 (Figs. 1 and 3) by the sprocket 160, chain 161, sprocket 162, shaft 163, bevel gear 164, and shaft 165 on which is mounted the driving pulley 166. A spring as 167 would normally retain the platform 100 in raised position as shown and this spring is extended when the bell crank 157 is rocked by the cam follower 156.

In order to render the platform inactive while the imperforated portion of the belt 70 is being moved beneath the plungers 102, suitable trip mechanism may be provided. This may be secured by placing a cam strip as 168 on the outer face of the belt or apron 70 to act through the medium of a follower roll 169, lever 170 pivoted at 171, link 172 and trigger 173. The roll 169 is held against the belt by a spring 174. When the roll rides on the cam strip 168, the trigger is moved into engagement with the block 175, causing the roll 156 to operate the bell crank 157 through the swinging arm 176 and the trigger. When the follower roll 169 passes from the cam strip 168, the spring 174 causes the link 172 to force the trigger out of engagement with the block 175 and thus there is no operative connection between the follower 156 and the bell crank 157. In this situation the platform 100 is inactive and will remain so until the cam strip again renders it operative for the first group of pockets to be discharged.

The control mechanism

A suitable control mechanism is diagrammatically illustrated at the bottom of Fig. 1 and designed to provide periodic operation of the various parts of the apparatus. This mechanism controls the operation of the motor 130 which drives the various parts of the apparatus.

A clock 180 shown at the left is set to make and break a battery circuit 181 at predetermined intervals, and in this circuit is located a relay 182. When this relay is energized by closing of the contact at the clock, it moves an armature 183 to establish contact at 184. This causes a solenoid 185 to be energized from a power source 186 through the leads 187, 188, 184, 208, 191, 192 and 193. The energizing of the solenoid closes the switch at 194 and this energizes the motor 130 through the leads 187, 188, 189, 190, 191, 192 and 193.

Referring for the moment to the lower right hand corner of Fig. 1, it will be seen that a pinion 195 on the shaft 134 drives a gear 196 on an idler shaft 197 supported in suitable bearings 198 on the base 11. This gear carries a finger or cam lug 199 which in the position of the parts indicated, has acted against a cam block 204 on the pivoted arm 200 to cause this arm to be depressed against the action of spring 201. On this arm is a suitable contact 202 which in the raised position of the arm, connects circuit terminals 203 but is shown moved out of contact therewith to break the circuit at this point by the depression of the arm in the manner described.

Again referring to the control system in which operation of the motor has now been started as described. When the motor started, the finger 199 was in the position shown and the terminals 203 spaced from the contact 202. The operation of the motor causes the shaft 136 to rotate and therefore the gear 196 moves the finger 199 out of engagement with the cam block 204 on the arm 200, closing the circuit at 202. At about this time the clock 180 operates to break the circuit 181, deenergizing the relay 182 and opening circuit 187, 188, 184, 208, 191, 192 and 193, but the motor 130 will continue to operate as the solenoid switch 185 remains energized from the source of power 186 through the leads 193, 192, 191, 208, 209, 210, 188 and 187. When the operation of the motor has caused the gear 196 to make a complete revolution, the finger 199 contacts with the block 204, forcing down the arm 200, breaking the circuit at 202 and stopping the motor. This occurs when the mechanism has made a complete cycle of operations as will be presently explained.

The operation of the apparatus

At the start of operations, the parts are in the positions shown in the drawings. The tank 10 contains water or other liquid to be frozen to the level automatically established by the float 13 and the submerged pockets 76 in the apron 70 are filled therewith. Air and brine are now admitted to the nozzles 81 and 31 respectively and the control clock 180 set for the period required to freeze the water within the apron pockets.

During the freezing operation all parts of the apparatus are at rest. The brine or other refrigerating medium is projected by the nozzles 31 into the corresponding pockets 51 within the cylinder 16 and strikes against the portions of the thin heat conducting wall 18 of the cylinder 16 exposed therein. The portions of this wall thus subjected to the action of the brine also form the bottom of the corresponding pockets 76 in the apron as the perforations 51 and 76 are in substantial registration. Heat exchange therefore takes place through the wall 18 and the liquid in the apron pockets progressively becomes solidified, beginning at the surface of the cylinder. The air projected into these pockets by the nozzles 81 during the freezing operation removes any foreign matter therefrom and assists in providing clear ice therein.

At the completion of this freezing operation a cube or block of ice of size and shape determined by the pockets 76 in the apron, completely fills each of these pockets. The clock 180 now automatically starts the motor 130 in the manner described in connection with the control mechanism, causing the cylinder 16 to be rotated by a step by step movement through the medium of the cam 135, roll 137, arm 138, pawl 139, ratchet 140, shaft 134 and gears 152, 151 and 150. This step by step rotation of the cylinder 16 continues as each revolution of the cam 135 causes the ratchet 140 to be rotated one tooth distance. The direction of rotation of the cylinder 16 is indicated by an arrow (Fig. 1). The apron 70, being directly driven by the cylinder through the medium of the teeth 77 acting in the apron slots 78, moves in each advance approximately a distance say seven rows of pockets 76. After a definite number of these advances, say five, the first group of seven rows of pockets 76 is brought into registration with corresponding openings 104 in the table 103 and a pause ensues.

At the completion of the freezing operation the blocks in their respective pockets firmly adhere to the cylinder wall but upon the rotation of the cylinder they are detached therefrom by deformation of this wall in the following manner. The spiders 32 within the cylinder 16 remain stationary at all times and the rolls 34 carried thereby only rotate about their own axes. Thus when the cylinder 16 is rotated, these rolls 34 produce a deformation of the cylindrical wall 18 which acts to disengage the ice cubes in the pockets 76 from this wall and thus these cubes are free to be carried upwardly by the apron to the discharging mechanism.

During each pause in the advance of the apron after the discharging device is rendered operable by the cam strip 168, the cams 135 cause the platform 100 to be moved downwardly, forcing the plungers 102 through this group of apron pockets and ejecting the ice cubes therein. The cubes thus ejected pass through the funnels 105 into the first carton 106 on the conveyor 107. The platform 100 is now raised by the spring 161, withdrawing the plungers 102 before the next advance of the apron. The bevel gear 164 causes the conveyor 107 to bring the next carton into position to be filled with the ice cubes while the apron is being advanced to move the next group of pockets into position to have the ice cubes therein ejected therefrom in the same manner as the first group. This operation continues until the apron has made one complete revolution and returned to its initial position, completing a cycle of operations.

For the purpose of illustration, the length of the apron 70 is assumed to be twice the circumference of the cylinder 16 although any other convenient ratio may be adopted. Thus when the cylinder has made two complete revolutions, the apron has made one revolution. The ratio of the gears 195 to 196 is therefore fixed the same or one to two, so that the finger 199 on the gear 196 will act to stop the motor and the rotation of the cylinder after such cylinder has made its two complete revolutions. The motor now remains inactive until the freezing of a new lot of ice cubes in the apron pockets has taken place and the apparatus is ready to repeat the discharging operation, as in the last cycle. These cycles will follow automatically as long as desired.

To briefly summarize the operation, it will be seen that in the apparatus shown all parts are stationary during the freezing of the ice cubes. On the completion of the freezing operation, the apron is advanced intermittently to bring the cubes to the discharging mechanism which operates during each period of pause of the apron. The cubes discharged from the apron are automatically deposited on a conveyor or into cartons carried thereon and transported to a receiving station or from the apparatus. The conveyor advances simultaneously with the apron and is at rest during the period when the plungers are discharging the cubes. While the apron 70 moves in the present apparatus step by step from the time is leaves the periphery of the cylinder 16 until it reaches the discharge position under the plungers 102, it will be obvious that mechanism may be provided to produce an uninterrupted movement during this portion of the cycle, and the periodic advance could begin when the first group of pockets had reached the discharging mechanism. In the same way, the periodic advance may be terminated and continuous movement resumed after the last group of pockets had been discharged and until the completion of the cycle.

From the foregoing description it will be seen that an apparatus is provided which is simple and durable in construction, efficient and automatic in action and capable of withstanding the exacting conditions of commercial use. The flexing or deformation of the cylinder or other member on or in which the pockets are formed or provided serves to loosen or partially disengage the ice in such pockets so that this ice may be readily removed. Heat exchange takes place rapidly between the refrigerating medium and the liquid in the pockets, and particularly when the refrigerating medium is projected directly on the wall of the cylinder or other member opposite the freezing pockets. The perforated lining of rubber or other insulating material serves to concentrate the refrigerating action on the pockets while the air jets aid in obtaining clear ice. A simple and effective means is provided for removing the ice from the pockets and packing it in cartons or otherwise disposing of it without the exercise of manual labor. Furthermore, it will be evident that the art described enables ice cubes or the like to be rapidly and economically produced in large volume.

It will be seen that this invention comprises an art and an apparatus, both of an essentially practical nature in which the several objects referred to are attained.

As the art herein described may be carried out in various ways and as the apparatus may be materially changed without departing from the scope of the invention, it is to be understood that all matter herein set forth or shown in the accompanying drawings is to be interpreted as illustrative and not in a limiting sense and that the term "ice" is not limited to pure water ice.

I claim:

1. Apparatus of the character described, comprising a deformable cylinder provided with a plurality of pockets on the surface thereof to receive a fluid to be solidified, and from which the solidified fluid is partially disengaged by the deformation of the cylinder.

2. Apparatus of the character described, comprising a cylinder having a deformable peripheral wall, a perforated lining within said wall, and an apron wrapped around a portion of said wall and having perforations therethrough substantially registering with the perforations in said lining.

3. Apparatus of the character described, comprising a cylinder having a deformable peripheral wall, and pockets on the outer surface of said wall to receive a fluid to be solidified, the inner surface of said wall being exposed to a refrigerating medium to provide heat exchange through the wall with the fluid in said pockets.

4. Apparatus of the character described, comprising a cylinder, an apron wrapped about a portion of said cylinder and movable relative thereto, and perforations in said apron forming with the cylinder wall a series of pockets on the periphery of the cylinder to receive a fluid to be solidified.

5. Apparatus of the character described, comprising a deformable cylinder, an apron wrapped about said cylinder and movable relative thereto, and perforations in said apron forming with the cylinder wall a series of pockets on the periphery of the cylinder to receive a liquid to be solidified, the solidified liquid being disengaged from the surface of said cylinder by deformation of the cylinder.

6. Apparatus of the character described, comprising a revoluble cylinder, and an apron wrapped about the periphery of said cylinder and having perforations in a portion thereof forming with the wall of the cylinder a series of pockets on said periphery, the perforated portion of said apron being movable away from the cylinder wall.

7. Apparatus of the character described, comprising a tank to contain a liquid, and a hollow deformable cylinder partially immersed in the liquid in said tank and containing a refrigerating medium, the cylinder being provided on its periphery with a plurality of pockets to receive said liquid and within which a portion of the liquid is solidified by heat exchange through the cylinder wall, the solidified liquid being partially disengaged from the cylinder by the deformation of said cylinder.

8. Apparatus of the character described, comprising a tank to contain a liquid to be solidified, a hollow cylinder partially immersed in the liquid in said tank, a lining for the peripheral wall of said cylinder having perforations therethrough to expose portions of said wall, and an apron wrapped about a portion of said wall and having perforations therein adapted to substantially register with the corresponding perforations in the lining in certain relative positions of the parts, and forming with the cylinder wall a series of pockets on the exterior of said wall.

9. Apparatus of the character described, comprising a tank to contain a liquid to be solidified, a deformable cylinder partially immersed in the liquid in said tank, a lining for the peripheral wall of said cylinder having perforations therethrough to expose portions of said wall, an apron wrapped about a portion of said wall and having perforations therein adapted to substantially register with the corresponding perforations in the lining in certain relative positions of the parts, and forming with the cylinder wall a series of pockets on the exterior of said wall, and means for deforming said cylinder.

10. Apparatus of the character described, comprising a liquid holding tank, a deformable cylinder partially immersed in the liquid in said tank and having pockets on its periphery to receive said liquid, spray means within said cylinder for subjecting the inner periphery of the cylinder wall to a refrigerating medium to solidify the liquid in said pockets by heat exchange through the cylinder wall, and means for deforming said cylinder to partially disengage the solidified liquid in said pockets.

11. Apparatus of the character described, comprising a tank to contain a liquid to be solidified, a hollow cylinder partially immersed in the liquid in said tank and having upon its periphery a plurality of pockets to receive said liquid, a lining for the peripheral wall of said cylinder having perforations therethrough to expose the portions of said wall opposite said pockets, and means for projecting jets of a refrigerating medium through the perforations in said lining against said exposed portions.

12. Apparatus of the character described, comprising a tank to contain a liquid, a hollow cylinder partially immersed in the liquid in said tank, a heat insulating lining fitting the inner periphery of said cylinder and having perforations therethrough exposing portions of the cylinder wall, an apron partially wrapped about said cylinder and having perforations therein adapted in certain relative positions of the parts to form with the cylinder wall pockets on the exterior of the cylinder substantially in registration with the corresponding perforations in the lining, and means for projecting jets of air under pressure into said pockets.

13. Apparatus of the character described, comprising a hollow revoluble cylinder, a flexible lining within the peripheral wall of said cylinder having perforations therein forming pockets on the inside of said wall, an apron in the form of a belt enveloping said cylinder and driven thereby, and perforations in said apron adapted to register with the corresponding perforations in said lining in certain relative positions of said apron and said cylinder.

14. Apparatus of the character described, comprising a hollow revoluble cylinder, a flexible lining within the peripheral wall of said cylinder having perforations therein forming pockets on the inside of said wall, an apron in the form of an endless belt enveloping said cylinder and driven thereby, perforations in said apron adapted to register with the corresponding perforations in said lining in certain relative positions of said apron and said cylinder, and means for rotating said cylinder.

15. Apparatus of the character described, comprising a hollow revoluble cylinder, a flexible lining within the peripheral wall of said cylinder having perforations therein forming pockets on the inside of said wall, an apron in the form of an endless belt enveloping said cylinder, perforations in said apron adapted to register with the corresponding perforations in said lining in certain relative positions of said apron and said cylinder, and means for periodically rotating said cylinder and driving said apron.

16. Apparatus of the character described, comprising a hollow cylinder, a rubber lining for the peripheral wall of said cylinder having perforations therein to expose portions of the inner surface of said wall, and means for projecting a refrigerating medium into said perforations and against said surface.

17. Apparatus of the character described, comprising a hollow cylinder, a lining of heat insulating material for the peripheral wall of said cylinder and having perforations extending therethrough to expose portions of the inner surface of said wall, and pockets on the exterior of said cylinder substantially opposite said perforations.

18. Apparatus of the character described, comprising a flexible hollow cylinder open at its ends, bells disposed opposite said ends, flexible aprons connecting said bells with the corresponding ends of the cylinder to form therewith a closed receptacle, and pockets on the periphery of said cylinder.

19. Apparatus of the character described, comprising a revoluble cylinder having a deformable peripheral wall, an idler spaced from said cylinder and having its axis parallel with the axis of the cylinder, and an apron in the form of a belt enveloping said cylinder and said idler, said apron being provided with perforations extending therethrough and forming with the peripheral wall of the cylinder pockets on said wall in certain relative positions of said apron and said cylinder.

20. Apparatus of the character described, comprising a revoluble cylinder, idlers spaced from said cylinder and having their axes parallel with the axis of the cylinder, a perforated apron enveloping said cylinder and said idlers, and a conveyor movable transversely of said apron.

21. Apparatus of the character described, comprising a deformable cylinder, an apron partially enveloping the periphery of said cylinder, perforations in said apron forming with the cylinder wall pockets to receive liquid to be frozen, and means for deforming said cylinder to detach the frozen liquid in said pockets from the cylinder wall.

22. Apparatus of the character described, comprising a revoluble cylinder, an apron partially enveloping the periphery of said cylinder and having perforations therethrough forming with the cylinder wall pockets to receive liquid to be frozen, and means for removing the frozen liquid from said pockets.

23. Apparatus of the character described, comprising a hollow revoluble cylinder, an apron partially enveloping the periphery of said cylinder and having perforations therein forming with the cylinder wall in certain relative positions of the parts pockets to receive liquid to be frozen, means for relatively moving the cylinder and apron to cause the perforated portion of the apron to be moved away from the cylinder after the liquid has been frozen therein, and plungers movable through said perforations to remove the frozen liquid therefrom.

24. Apparatus of the character described, comprising a deformable cylinder provided with a flexible lining having perforations therein exposing portions of the cylinder wall thereof, a refrigerating medium within said cylinder, an apron partially enveloping the periphery of said cylinder and having perforations therein adapted to substantially register with the corresponding perforations in the lining and forming with the peripheral wall of the cylinder pockets on said cylinder to contain a liquid to be frozen, and means for ejecting the frozen liquid from said pockets.

25. Apparatus of the character described, comprising a deformable cylinder, a flexible lining within the cylinder wall thereof having perforations extending therethrough to expose portions of the inner face of said wall, an apron of relatively thick flexible material partially enveloping the periphery of said cylinder and having perforations therein forming with the opposing wall of the cylinder a series of pockets in substantial registration with the corresponding perforations in the lining and adapted to contain a liquid to be frozen, means for deforming said cylinder to cause the frozen liquid within said pockets to be detached from the cylinder wall, and means for ejecting the frozen liquid from said pockets.

26. Apparatus of the character described, comprising a deformable cylinder, a flexible lining within the cylinder wall thereof having perforations extending therethrough to expose portions of the inner face of said wall, an apron of relatively thick flexible material partially enveloping the periphery of said cylinder and having perforations therein forming with the opposing wall of the cylinder a series of pockets in substantial registration with the corresponding perforations in the lining and adapted to contain a liquid to be frozen, means for deforming said cylinder to cause the frozen liquid within said pockets to be detached from the cylinder wall, means for ejecting the frozen liquid from said pockets, and means for conducting the ejected articles to a receiving station.

27. Apparatus of the character described, comprising a deformable cylinder, a flexible lining within the cylinder wall thereof having perforations extending therethrough to expose portions of the inner face of said wall, an apron of relatively thick flexible material partially enveloping the periphery of said cylinder and having perforations therein forming with the opposing wall of the cylinder a series of pockets in substantial registration with the corresponding perforations in the lining and adapted to contain a liquid to be frozen, means for deforming said cylinder to cause the frozen liquid within said pockets to be detached from the cylinder wall, means for ejecting the frozen liquid from said pockets, a conveyor, and means for conducting the ejected articles into cartons on said conveyor.

28. Apparatus of the character described, comprising a conveyor belt provided with a plurality of perforations each of which is adapted to hold a piece of ice, means coacting with said belt to remove the ice from said perforations, and means on said belt for controlling the operation of said ice removing means.

29. Apparatus of the character described, comprising a substantially hollow rotary cylinder to contain a refrigerating medium, at least one roll spaced from said cylinder and having its axis parallel with the axis of the cylinder, a conveyor belt enveloping said cylinder and said roll means for driving said belt, cylinder and roll, perforations in said belt forming with the cylinder wall pockets to receive a liquid to be frozen by transfer of heat through the cylinder wall.

30. Apparatus of the character described, comprising a tank to contain a liquid to be frozen, a revoluble cylinder partially immersed in said liquid, a refrigerating medium circulating in said cylinder, a plurality of idler rolls spaced from said cylinder and having their axes parallel with the axis of the cylinder, a conveyor belt enveloping said cylinder and said idler rolls and rotating with said cylinder, perforations in a portion of said belt forming with the cylinder wall in certain relative positions of the parts pockets to receive said liquid, and means for rotating said cylinder.

31. Apparatus of the character described, comprising a substantially hollow rotary cylinder to contain a refrigerating medium, an idler roll spaced from said cylinder and having its axis parallel with the axis of the cylinder, a conveyor belt enveloping said cylinder and said idler roll and driven by said cylinder, perforations in said belt forming with the cylinder wall pockets to receive a liquid to be frozen by transfer of heat through the cylinder wall, means for rotating said cylinder, and means for ejecting the frozen liquid from said pockets.

32. Apparatus of the character described, comprising a substantially hollow rotary cylinder to contain a refrigerating medium, an idler roll spaced from said cylinder and having its axis parallel with the axis of the cylinder, a conveyor belt enveloping said cylinder and said idler roll and driven by said cylinder, perforations in said belt forming with the cylinder wall pockets to receive a liquid to be frozen by transfer of heat through the cylinder wall, means for rotating said cylinder, means for ejecting the frozen liquid from said pockets, and means for receiving and removing the frozen liquid ejected from said pockets 33. Apparatus of the character described, comprising a deformable rotary cylinder to contain a refrigerating medium, an idler roll spaced from said cylinder and having its axis substantially parallel with the axis of the cylinder, a conveyor belt at least partially enveloping said cylinder and said idler roll and revoluble with said cylinder, openings extending through said belt and forming in certain positions of the cylinder and belt pockets on the periphery of the cylinder to receive a liquid to be frozen, means for rotating said cylinder, and means for deforming said cylinder to separate from the surface thereof the frozen liquid in said pockets.

34. Apparatus of the character described, comprising a rotary cylinder adapted to contain a refrigerating medium, a belt at least partially enveloping said cylinder, teeth on the periphery of said cylinder adapted to enter corresponding slots in said belt to cause the belt to be driven by the rotation of the cylinder, and a plurality of perforations in said belt forming with the peripheral wall of the cylinder pockets to receive a liquid to be frozen.

35. Apparatus of the character described, comprising a rotary deformable cylinder having upon its periphery a plurality of pockets to receive a liquid to be frozen, a refrigerating medium in said cylinder acting by heat exchange through the wall of the cylinder to freeze the liquid in said pockets, and means for projecting jets of air under pressure into said pockets during the freezing of the liquid therein.

36. Apparatus of the character described, comprising a revoluble cylinder, a belt enveloping the periphery of said cylinder and revoluble therewith, a refrigerating medium in said cylinder, perforations in said belt forming with the cylinder wall pockets to receive liquid to be solidified therein by heat exchange through said wall, and means for imparting a step by step rotary movement to said cylinder and said belt.

37. Apparatus of the character described, comprising a tank containing a liquid to be solidified, a revoluble cylinder partially immersed in the liquid in said tank, a belt enveloping and revoluble with said cylinder, perforations in said belt forming with the peripheral wall of the cylinder pockets to receive the liquid in said tank and within which the liquid is frozen by heat exchange through said wall, means for imparting a step by step rotary movement to said cylinder and said belt, and means operable in synchronism with said belt to remove the solidified liquid from said pockets during a period of rest of said belt.

38. Apparatus of the character described, comprising a tank containing a liquid to be solidified, a revoluble cylinder partially immersed in the liquid in said tank, a belt enveloping and revoluble with said cylinder, openings extending through said belt forming with the peripheral wall of the cylinder pockets on the cylinder to receive the liquid in said tank and within which the liquid is frozen by heat exchange through said wall, means for rotating said cylinder, time controlled mechanism for imparting a periodic step by step advance to said cylinder and belt, and means operable in synchronism with said belt and said cylinder to remove the solidified liquid from said pockets during periods of rest of said belt.

39. Apparatus of the character described, comprising a heat exchange member having a refrigerated surface, a detachable mold member adapted to form with said surface a definitely shaped body of substance to be frozen, means for removing said detachable mold member from said refrigerated surface and for moving said mold member back into position against said refrigerated surface, and means for removing said shaped body of substance from said detachable mold member while said mold member is in a position removed from said refrigerated surface.

40. Apparatus of the class described, comprising a deformable member having a surface capable of congealing a fluid, removable means for partitioning off said surface, whereby fluid congealed on said surface is at least partially solidified in predetermined shapes, and means for deforming said member to unfasten the solidified product from the said surface, whereby said partitioning means is removable from said surface.

41. In combination, a deformable freezing surface, means for maintaining a refrigerating medium on one side of said surface, the other side of said surface being capable of congealing fluid brought into contact therewith, removable means for partitioning off said congealing surface, whereby fluid congealed on said surface is solidified in predetermined shapes, and means for flexing said freezing surface to loosen the solidified product from said surface, and means for removing said removable partitioning means and product as a unit from said surface.

42. In apparatus of the class described, in combination, a freezing surface, and means for partitioning off said freezing surface whereby fluid solidified on said surface is in predetermined shapes, and means for periodically removing said partitioning means from said surface, ejecting the product therefrom, and returning said partitioning means to said freezing surface.

43. In apparatus of the character described, in combination, a freezing surface, comprising a revoluble cylinder, means for maintaining a refrigerating medium on one side of said cylinder and maintaining the other side of said cylinder at a refrigerating temperature, an apron capable of engaging at least a portion of the freezing surface of said cylinder, said apron having cut-out portions whereby the freezing surface of said cylinder may be partitioned off to mold a fluid congealed on said freezing surface.

44. In apparatus of the character described, in combination, a freezing surface comprising a flexible cylinder, means for applying a refrigerant to the interior of said cylinder, and a lining on the interior of said cylindrical surface having cut-out portions, an apron in the form of an endless belt for engaging at least a portion of the exterior surface of said cylinder, said apron also having cut-out portions, the cut-out portions of said lining and the cut-out portions of said apron registering with each other, and means for periodically rotating said cylinder to remove that part of the apron having cut-out portions from contact with said cylinder, and then again returning said part to said cylinder.

45. In apparatus of the class described, in combination, a freezing surface comprising a revoluble cylinder, an apron, pulleys spaced from said cylinder having their axes parallel to the axes of the cylinder, said apron engaging said cylinder and passing over said pulleys, and having cut-out portions which when engaging the surface of the cylinder partition off said surface, whereby fluid congealed on said surface is given predetermined shapes.

46. In apparatus of the class described, in combination, a freezing surface, means for partitioning off said freezing surface whereby fluid solidified on said surface is in predetermined shapes, and means for periodically loosening the solid product from said surface and for periodically removing said partitioning means from said surface, ejecting the product therefrom, and returning said partitioning means to said freezing surface.

47. In apparatus of the class described, in combination, a freezing surface comprising a revoluble cylinder having a deformable peripheral wall, an apron, pulleys spaced from said cylinder having their axes parallel to the axes of the cylinder, said apron engaging said cylinder and passing over said pulleys, and having cut-out portions which when engaging the surface of the cylinder partition off said surface, whereby fluid congealed on said surface is given predetermined shapes, said pulleys having relatively small radii in comparison with the radius of said cylinder, whereby the apron in passing over said pulleys is flexed to a greater extent than in passing over said cylinder.

48. In apparatus of the class described, in combination, a heat conducting wall, means for applying a refrigerating medium to one side of the said wall, means for applying liquid to be solidified to the other side of said wall, a lining on the side of the wall to which the refrigerating medium is applied, said lining having cut-out portions whereby parts of said wall are exposed to said refrigerating medium, partitioning means for partitioning off the freezing side of said wall, the walls of said partitioning means registering with the walls of said lining; means for periodically loosening the frozen product from said surface, and means for periodically moving said partitioning means from said freezing surface in a step-by-step movement, and means for ejecting the frozen product from said partitioning means during the stationary periods of said step-by-step movement.

49. A method of manufacturing relatively small units of clear ice, which consists in automatically applying partitioning sections to a freezing surface, supplying said sections with water to be frozen, automatically supplying jets of air to said water during the freezing thereof, automatically loosening the frozen water or ice from said freezing surface, automatically withdrawing the partitioning sections and ice associated therewith and ejecting the ice from said partitioning sections.

50. A continuous method of manufacturing relatively small units of solidified fluid which consists in automatically periodically partitioning off the freezing surface to form individual compartments, automatically supplying the fluid to be solidified to said compartments, automatically loosening the solidified fluid from the freezing surface, automatically moving the compartment-forming means with the associated ice from the freezing surface, automatically removing the ice from the compartments, and then automatically returning the compartment-forming means to the freezing surface.

51. The method of congealing fluid comprising the steps of supplying said fluid to a refrigerated surface, of positioning ice shaping means in operative relationship with said surface prior to the congealing of the fluid thereon and about which the congealing fluid congeals, of automatically loosening the congealed fluid from said refrigerated surface, and of removing said ice shaping means from said surface to remove the congealed fluid from said surface.

52. The method of congealing fluid comprising the steps of supplying said fluid to a flexible refrigerated surface, of positioning ice shaping means in operative relationship with said surface prior to the congealing of the fluid thereon and about which the congealing fluid congeals, of automatically flexing the surface to loosen the congealed fluid therefrom, and of automatically removing said ice shaping means from said surface to remove the congealed fluid therefrom.

53. In apparatus of the class described, in combination, an endless flexible freezing surface, idlers spaced from said freezing surface and having their axes parallel with the axis of the freezing surface, an open meshed belt enveloping said freezing surface and idlers, engaging a portion of said freezing surface, and having two points of tangency with respect to said freezing surface, and means for rotating said endless flexible freezing surface to cause said belt to travel thereabout, said belt leaving said freezing surface at one point of tangency and returning to said freezing surface at the other point of tangency; means for supplying water to that portion of said freezing surface engaged by said belt whereby ice forms in the interstices of said belt and on said freezing surface; means for deflecting said flexible freezing surface in the proximity of the point of tangency where said belt leaves said freezing surface to loosen the ice from said freezing surface whereby the ice is free to move with said belt away from said freezing surface.

54. Apparatus of the character described, including a refrigerated area, a source of liquid to be frozen by said refrigerated area, a perforated conveyer belt intermediate said area and liquid supply and positioned to cause liquid frozen by said area to freeze in said perforations, means for automatically removing said conveyer belt from said refrigerated area with said frozen liquid; means for ejecting the frozen liquid from said perforations, and means on said belt for controlling the operation of said ejecting means.

55. In apparatus for congealing a fluid, in combination, a refrigerated surface, a source of fluid to be solidfied, removable ice holding means normally positioned in operative relation with respect to said surface so as to cause fluid congealing on said surface to form about said means; means for loosening the congealed fluid from said surface, and means for automatically removing said removable means with the congealed fluid from its normal operative position to permit the removal of the congealed fluid therefrom, and for returning it to its normal operative position.

56. In apparatus for congealing a fluid, in combination, a flexible refrigerated surface, a source of fluid to be solidified, removable ice holding means normally positioned in operative relation to said surface so as to cause fluid congealing on said surface to form about said means; means for flexing said flexible refrigerated surface to loosen the congealed fluid therefrom, and means for automatically removing said removable means with the congealed fluid from its normal position to permit the removal of the congealed fluid therefrom, and for returning it to its normal operative position.

57. Apparatus for freezing ice in predetermined shapes, such as cubes, etc., comprising in combination, an endless belt having openings therein for holding ice molded to the contours of said openings, means for filling said openings with water while said openings are inverted and not occupied with ice shapes, refrigerating means for causing the water filling the inverted openings to congeal into said ice shapes, and means for removing said ice shapes from said openings.

58. Apparatus for freezing ice in predetermined shapes, such as cubes, etc., comprising in combination, an ice supporting mechanism having openings therein for holding ice molded to the contours of said openings, means for filling said openings with water while said openings are inverted and not occupied with ice shapes, refrigerating means for causing the water filling the inverted openings to congeal into said ice shapes, means for removing said ice shapes from said openings; and means for synchronizing the extraction of said ice shapes and the filling of empty openings.

59. A continuous process of manufacturing ice in small units which comprises moving a succession of partitioning sections into operative relation with a freezing surface to form individual compartments therewith, moving said freezing surface to maintain a stationary relationship between said partitioning sections and said freezing surface while the two are maintained in operative relationship, filling said compartments with water to be frozen as the compartments are successively formed and successively moving said partitioning sections out of operative relation with said freezing surface to remove the ice units from said freezing surface.

60. A continuous process of manufacturing ice in small units which comprises moving a succession of partitioning sections into operative relation with a freezing surface to form individual compartments therewith, moving said freezing surface to maintain a stationary relationship between said partitioning sections and said freezing surface while the two are maintained in operative relationship, filling said compartments with water to be frozen as the compartments are successively formed and successively moving said partitioning sections out of operative relation with said freezing surface to remove the ice units from said freezing surface, and extracting the ice units from the partitioning sections as said sections are successively removed from operative relation with said freezing surface.

61. Apparatus for freezing ice in predetermined shapes, comprising, in combination, a refrigerated surface, removable ice holding mechanism having openings adapted to be filled with water to be frozen and adapted to mold the ice shapes thus formed and hold the same, automatic mechanism for bringing said ice holding mechanism and said refrigerated surface into operative relation, means for maintaining said openings in a water filled condition while said refrigerated surface and ice holding mechanism are in said operative relation, whereby the water in said openings is frozen on said refrigerated surface; and means for controlling the operation of said automatic mechanism to synchronize its operation with the freezing of the water.

62. Apparatus for manufacturing individual pieces of ice of predetermined shapes, comprising, in combination, a movable refrigerated surface, movable partitioning mechanism having openings therein adapted to form individual compartments with said refrigerated surface when said refrigerated surface and partitioning sections are in contact with one another, means for moving said partitioning mechanism into contact with said refrigerated surface, and means for moving said refrigerated surface to maintain a stationary relationship between said partitioning mechanism and said surface while the two are maintained in contact.

63. Apparatus of the character described, comprising a tank to contain a liquid to be solidified, a hollow rotatable refrigerated cylinder partially immersed in the liquid in said tank, and means for forming a plurality of cavities on the periphery of said cylinder, said cavities being adapted to receive said liquid, means for rotating said cylinder and simultaneously removing said cavity forming means from and returning said cavity forming means to said hollow cylinder whereby liquid frozen by said cylinder in said cavities is removed from said cylinder, and means for projecting submerged jets of air into said cavities during the solidifying of the liquid therein.

64. An ice-freezing device comprising: a refrigerated rotating drum, an endless flexible belt movable around said drum and having liquid and ice retaining cavities therein and close heat-conducting relation with the contacting surface of said refrigerated drum, means for supplying said cavities with liquid to be frozen and keeping said cavities supplied with liquid until the cavities are filled with ice frozen by said refrigerated drum.

65. An ice freezing device comprising an endless flexible belt having container cavities carried thereupon, a rotatable drum and ice-ejecting means upon which said endless belt is mounted, means for filling said cavities with liquid to be frozen while said cavities are passing around said drum, and means for chilling and freezing said liquid while in said cavities, said ice-ejecting means ejecting the frozen contents from said cavities as said belt passes over said ejecting means.

66. Apparatus for making ice blocks, comprising, in combination, a water tank, a drum journaled to revolve in said tank, means for imparting an ice-forming temperature to the periphery of said drum, guide pulleys, an endless band of freezing cells trained over said drum and pulleys, said cells having open ends traveling in contact with the periphery of said drum, and means for driving said drum and band.

67. Apparatus for freezing relatively small ice shapes comprising a refrigerated freezing area, cavity containing means having cavities for receiving water to be frozen, means for moving said cavity containing means into heat exchanging stationary relationship with said refrigerated area, means for keeping said cavities supplied with liquid to be frozen while said cavity containing means and said refrigerated freezing area are in said heat exchanging relationship whereby ice is formed in said cavities, means for loosening said cavity containing means with respect to said refrigerated freezing area subsequent to the freezing of said ice and means for subsequently removing said cavity containing means from said heat exchanging relationship with said refrigerated freezing area.

68. Apparatus for freezing relatively small ice shapes comprising refrigerated freezing means, cavity containing means having cavities for receiving water to be frozen, means for automatically moving said cavity containing means into heat exchanging stationary relationship with said refrigerated means, means for supplying said cavities with liquid to be frozen whereby ice is formed in said cavities while said portions are in said heat exchanging stationary relationship with the said refrigerated freezing means, and means for subsequently automatically removing successive portions of said cavity containing means from said heat exchanging relationship with said refrigerated freezing means without disturbing the relationship of remaining portions with said refrigerated freezing area.

69. Apparatus for freezing relatively small ice shapes comprising a refrigerated freezing area, means having cavities for receiving water to be frozen, means for moving cavities of said cavity-containing means into heat-exchanging relationship with said refrigerated area, means for supplying said cavities with liquid to be frozen while said cavities and said refrigerated freezing area are in said heat-exchanging relationship whereby ice is formed in said cavities, means for freeing said cavity-containing means with respect to said refrigerated freezing area and means for removing said ice-containing cavities from said heat-exchanging relationship with said freezing area.

CROSBY FIELD.